May 30, 1939.  A. J. CORNELISSEN  2,160,199
VEHICLE WHEEL
Filed April 16, 1936

INVENTOR
Arnold J. Cornelissen
BY
Beau, Brooks, Buckley & Beau
ATTORNEY

Patented May 30, 1939

2,160,199

UNITED STATES PATENT OFFICE 2,160,199

VEHICLE WHEEL

Arnold J. Cornelissen, Buffalo, N. Y.

Application April 16, 1936, Serial No. 74,746

1 Claim. (Cl. 301—39)

This invention relates to safety wheels for vehicles and more particularly to that type of safety wheel wherein an auxiliary wheel, normally out of contact with the road surface, is associated with a main vehicle wheel.

In the present automotive construction the wheels are almost universally equipped with pneumatic tires. The chief objections to their use have been the potential danger residing in the ever present possibility of puncture, blowout, or other sudden deflation of the tire, and the inconvenient circumstances under which such exigencies frequently arise.

It has heretofore been proposed to mount an auxiliary wheel alongside the main pneumatic-tire equipped wheel, the auxiliary wheel being of smaller diameter than the diameter of the pneumatic tire when the tire is inflated within safe limits, but of sufficiently large diameter to support the vehicle when the pneumatic tire is wholly or partially deflated, and thereby take the load of the vehicle from the pneumatic tire.

By this expedient tipping of the vehicle, when the vehicle is in motion and a tire becomes deflated, is avoided, and it is possible to continue to drive the vehicle to a point where tire service may be had without injury to the pneumatic tire. Other advantages of this construction are the added traction provided thereby when driving in heavy mud or snow and the possibility of driving the vehicle so that the auxiliary wheel ascends a wedge or block to raise the wheel clear of the road for tire or other repairs.

The proposed constructions referred to have heretofore taken the form of mere impractical suggestions or devices intended to be temporarily or superficially associated with the usual vehicle wheel and have not lent themselves to ready and facile adaptation to modern wheel and wheel mounting construction. The objections to previously suggested constructions become more pronounced with the present rapid trend of automotive manufacturers toward greater compactness of design and the use of lower-pressure tires.

The present inventor has devised a construction for an auxiliary wheel for motor vehicles which permits its permanent incorporation in a vehicle wheel and wheel mounting construction without substantial rearrangement or redesign of the present construction. Further, the instant invention provides a sturdy and practical construction with a minimum of material and labor.

In the embodiment of the invention illustrated in the accompanying drawing the auxiliary wheel is incorporated with the usual brake drum and serves to materially assist radiation of heat from the drum.

Figure 1:
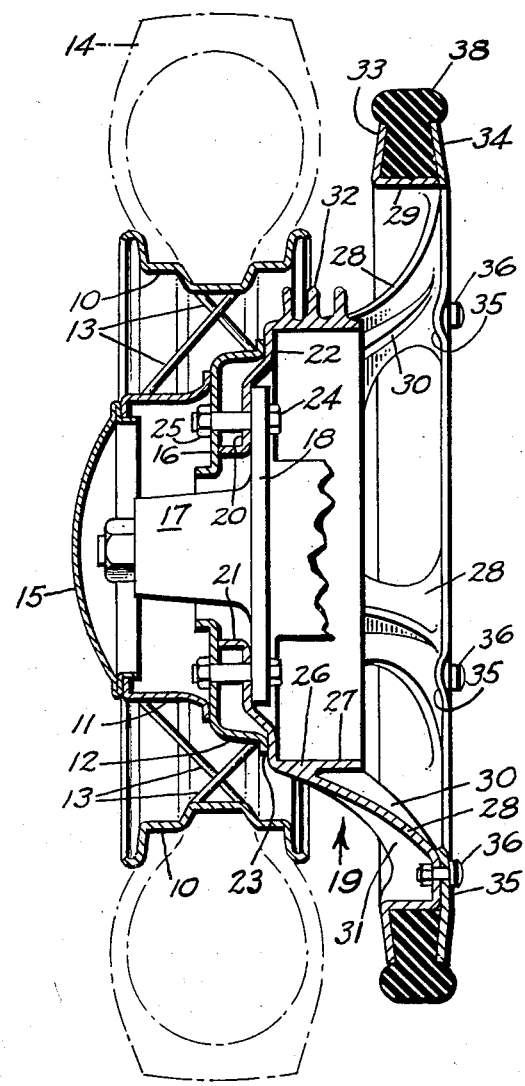
Fig. 1 is a cross-section taken upon the axis of an ordinary vehicle wheel fitted with a pneumatic tire and incorporating the new and improved safety wheel.
Figure 2:
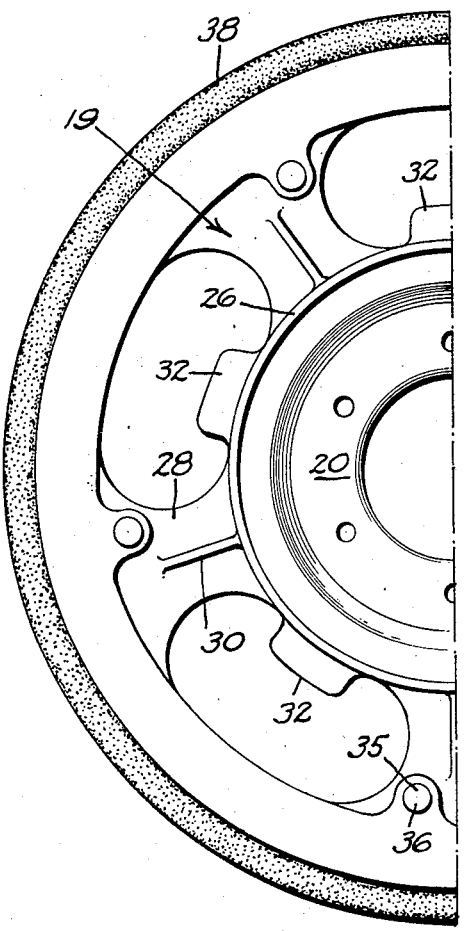
Fig. 2 is a side elevation of the safety wheel.

The vehicle wheel with which the present invention is shown associated is of more or less conventional design and comprises a felly or rim 10 supported by a composite welded hub assembly 11, 12, through the medium of spokes 13. The spokes 13 may be replaced by steel disks or any other acceptable construction. The rim 10 is fitted with a pneumatic tire and tube assembly shown in dotted lines at 14 and the hub is enclosed at its outer end by a hub cap 15.

The member 12 of the hub assembly 12, 13 is provided with an inwardly extending annular flange 16 for a purpose hereinafter to be described. At 17 is indicated a housing rotatably mounted on the axle of the vehicle (not shown) in the conventional manner, and the housing is provided with an annular flange 18.

In the particular embodiment disclosed the inventor has provided a unitary, integral member 19 which includes brake drum means for cooperating with the usual brake shoes and associated operating mechanism (not shown), and means for supporting an auxiliary road-engaging surface. This integral member 19 comprises a ring-shaped portion 20 terminating at its inner periphery in an annular flange 21 and having an outer ring-shaped portion 22 offset therefrom.

The flange 21 of the member 19 bears against the portion 16 of the hub assembly and the portion 22 bears against a flange 23 of the hub assembly to give firm support and assure rigid relation between the hub assembly and the member 19. The hub assembly 11, 12, the member 19, and the axle housing 17, are all held in assembled relation by means of screws 24 which pass through the flange 18, the portion 20 of the member 19, and the flange 16 of the hub assembly. The screws 24 are secured by nuts 25.

The portion 22 of the member 19 terminates outwardly in an annular flange 26 which provides, on its inner periphery 27, a braking surface for cooperation, as previously indicated, with the usual complementary braking mechanism, not shown.

A series of arms 28, integral with the flange 26, radiate from its outer periphery and terminate in an integral annular flange portion 29. The arms 28 are reinforced by ribs 30 and 31 on their inner and outer sides respectively and about the brake drum or flange portion 26 are disposed a series of radiating fins 32 extending between the bases of the arms 28.

The outer flange portion 29 terminates at one of its edges in a substantially radially, outwardly extending clamping flange 33 and opposed to this clamping flange there is provided a clamping ring 34 having inwardly extending lugs 35 which are secured to the arms 28 by means of bolts 36 and nuts 37. The clamping flange 33 and the clamping ring 34 extend outwardly slightly toward each other and hold firmly between them a tire 38 which may be of the resilient, solid-rubber type or its equivalent.

It will be noted that the arms 28 extend not only radially but in offset relation to the plane of the vehicle wheel to properly position the auxiliary wheel with relation to the pneumatic tire 14 and avoid contact between the tire 14 and the auxiliary wheel when the pneumatic tire is deflated.

Particular attention should be paid to the intimate relationship of the arms 28 and flange 29 with the brake drum, and their extensive surface with respect to the brake drum. The added heat conductivity from the brake drum afforded by this arrangement is very large and assists to a surprising extent in dissipating heat generated within the drum, thereby keeping the temperature of the brake assembly as low as possible and maintaining maximum efficiency thereof and adding substantially to the life of the brake lining.

Although the portions 20 and 22 of the member 19 have been shown and described as offset with respect to each other this offset is for convenience in the particular installation depicted and the portions referred to may readily be made coplanar.

A single specific embodiment of the invention has been shown and described but this must be understood to be merely exemplary and the invention is not to be considered as limited in any way excepting as defined in the appended claim.

What is claimed is:

An auxiliary wheel for vehicles comprising a spider having an inner substantially radially extending, circular plate portion, an annular flange extending from the periphery of said plate portion to provide an internal braking surface, and arms of one piece with and extending from the outer surface of said annular flange and terminating in an annular clamping flange, a clamping ring associated with said clamping flange, a tire member held between said clamping ring and clamping flange, the plane of rotation of said tire member being offset from the plane of rotation of said braking surface and said arms being provided upon their opposite sides with web portions, the web on one side of each arm member beginning at said outer surface and diminishing in size toward said clamping flange and the web on the opposite side of said arm member beginning at said clamping flange and diminishing in size toward said outer surface, whereby the two webs are complementary and provide a stress reducing element of substantially uniform cross section extending between said outer surface and said clamping flange, and means associated with said inner plate portion for securing the entire assembly to the main wheel of a vehicle.

ARNOLD J. CORNELISSEN.